US012076597B2

(12) United States Patent
Desrosier et al.

(10) Patent No.: US 12,076,597 B2
(45) Date of Patent: Sep. 3, 2024

(54) FIRE PROTECTION SYSTEM FOR SLOPED COMBUSTIBLE CONCEALED SPACES

(71) Applicant: Globe Fire Sprinkler Corporation, Standish, MI (US)

(72) Inventors: John Desrosier, Plymouth, MA (US); Thomas Edwin Archibald, Midland, MI (US); Kevin Desmond Maughan, North Kingstown, RI (US); Kenneth Wayne Rogers, Omer, MI (US); Kim Phillip Gordon, Sterling Heights, MI (US); Stephen J. Meyer, Chester Springs, PA (US)

(73) Assignee: VICTAULIC COMPANY, Easton, PA (US)

(*) Notice: Subject to any disclaimer, the term of this patent is extended or adjusted under 35 U.S.C. 154(b) by 0 days.

(21) Appl. No.: 16/337,763

(22) PCT Filed: Feb. 7, 2019

(86) PCT No.: PCT/US2019/017028

§ 371 (c)(1),
(2) Date: Aug. 16, 2021

(87) PCT Pub. No.: WO2019/160740

PCT Pub. Date: Aug. 22, 2019

(65) Prior Publication Data

US 2021/0353988 A1 Nov. 18, 2021

Related U.S. Application Data

(60) Provisional application No. 62/630,313, filed on Feb. 14, 2018.

(51) Int. Cl.
*B05B 1/26* (2006.01)
*A62C 35/58* (2006.01)
(Continued)

(52) U.S. Cl.
CPC .............. *A62C 35/68* (2013.01); *A62C 35/58* (2013.01); *A62C 35/64* (2013.01); *B05B 1/06* (2013.01); *B05B 1/267* (2013.01)

(58) Field of Classification Search
CPC ....... A62C 35/58; A62C 35/60; A62C 35/605; A62C 35/62; A62C 35/64; A62C 35/645;
(Continued)

(56) References Cited

U.S. PATENT DOCUMENTS 1,667,425 A 4/1928 Loepsinger
1,796,159 A 3/1931 Pallady
(Continued)

FOREIGN PATENT DOCUMENTS

DE 1899279 U 8/1964
DE 112006002211 T5 7/2008
(Continued)

OTHER PUBLICATIONS

Wilkins, Roger The Use of Specific Application Sprinklers for Protecting Attics, Tyco Fire and Building Products (Year: 2007).*
(Continued)

*Primary Examiner* — Jason J Boeckmann
(74) *Attorney, Agent, or Firm* — Panitch Schwarze Belisario & Nadel LLP

(57) ABSTRACT

A fire protection system is provided for a space having a pitched roof constructed of structural members extending from a ridgeline to an eave, with respective channels therebetween. A first row of sprinklers is mounted to a first branch line extending generally parallel to the ridgeline. Each sprinkler is positioned within a respective channel, with consecutive sprinklers spaced apart having no less than one, and no more than five, channels therebetween. A second row of sprinklers, downslope from the first row, is mounted to a second branch line extending generally parallel to the
(Continued)

first branch line. Each sprinkler thereof is positioned within a respective channel, with consecutive second row sprinklers spaced apart as in the first row. Each second row sprinkler is also placed within a different channel from each first row sprinkler. A farthest number of channels between a first row sprinkler and a second row sprinkler is three.

18 Claims, 8 Drawing Sheets

(51) Int. Cl.
*A62C 35/64* (2006.01)
*A62C 35/68* (2006.01)
*B05B 1/06* (2006.01)

(58) Field of Classification Search
CPC ......... A62C 35/68; A62C 3/002; A62C 35/65; B05B 1/267
USPC ...................................................... 169/37, 16
See application file for complete search history.

(56) References Cited

U.S. PATENT DOCUMENTS

| | | | | |
|---|---|---|---|---|
| 2,684,121 | A | 7/1954 | Lim | |
| 3,454,097 | A | 7/1969 | Groos | |
| 3,833,062 | A | 9/1974 | Livingston | |
| 3,834,462 | A | 9/1974 | Orloff et al. | |
| 4,091,876 | A | 5/1978 | Valdatta | |
| 4,279,309 | A | 7/1981 | Fischer et al. | |
| 4,296,816 | A | 10/1981 | Fischer | |
| 4,351,393 | A | 9/1982 | Tyree | |
| 4,624,414 | A | 11/1986 | Ferrazza | |
| 4,800,961 | A | 1/1989 | Klein | |
| 5,020,601 | A | 6/1991 | Retzloff et al. | |
| 5,097,906 | A | 3/1992 | Polan | |
| 5,669,449 | A | 9/1997 | Polan et al. | |
| 5,829,532 | A | 11/1998 | Meyer et al. | |
| 6,098,718 | A | 8/2000 | Sato | |
| 6,336,509 | B1 | 1/2002 | Polan et al. | |
| 6,540,261 | B1 | 4/2003 | Painter et al. | |
| 6,637,518 | B1 | 10/2003 | Hillier et al. | |
| 6,889,774 | B2 | 5/2005 | Multer et al. | |
| 7,137,455 | B2 | 11/2006 | Green | |
| 7,290,618 | B2 | 11/2007 | Thomas et al. | |
| 7,611,077 | B2 | 11/2009 | Sesser et al. | |
| 7,757,967 | B1 | 7/2010 | Yang | |
| 7,841,418 | B2 | 11/2010 | Pahila et al. | |
| 7,909,111 | B1 | 3/2011 | Hinojosa et al. | |
| 8,083,002 | B1 * | 12/2011 | Golinveaux ........... | A62C 35/68 169/56 |
| 8,474,545 | B2 | 7/2013 | Takeuchi | |
| 8,544,556 | B2 | 10/2013 | Sundholm et al. | |
| 8,602,118 | B2 * | 12/2013 | Pigeon ................... | A62C 35/68 239/524 |
| 8,733,461 | B2 | 5/2014 | Pigeon | |
| 8,800,673 | B2 | 8/2014 | Multer et al. | |
| 9,278,239 | B2 | 3/2016 | Pigeon | |
| 9,302,132 | B2 | 4/2016 | Green et al. | |
| 9,339,675 | B2 | 5/2016 | Koiwa | |
| 9,381,386 | B2 | 7/2016 | Pigeon | |
| 9,675,827 | B2 | 6/2017 | Pigeon | |
| 9,849,321 | B2 | 12/2017 | Huotari et al. | |
| 9,868,005 | B2 | 1/2018 | Green et al. | |
| 9,956,443 | B1 | 5/2018 | Cutting | |
| 10,035,030 | B2 | 7/2018 | Pigeon | |
| 10,149,992 | B2 | 12/2018 | Pigeon | |
| 10,940,350 | B2 | 3/2021 | Pigeon | |
| 2005/0045739 | A1 | 3/2005 | Multer | |
| 2006/0021761 | A1 * | 2/2006 | Golinveaux ......... | A62C 35/645 169/17 |
| 2007/0256844 | A1 | 11/2007 | Blasing et al. | |
| 2008/0202773 | A1 | 8/2008 | Pigeon | |
| 2009/0218109 | A1 | 9/2009 | Sato | |
| 2011/0024138 | A1 | 2/2011 | Multer et al. | |
| 2015/0265865 | A1 * | 9/2015 | Pigeon ................... | A62C 35/68 169/54 |
| 2016/0023031 | A1 | 1/2016 | Thomas | |
| 2016/0375287 | A1 * | 12/2016 | Meyer ..................... | B05B 1/265 169/16 |
| 2016/0375288 | A1 | 12/2016 | Pigeon | |
| 2017/0165511 | A1 | 6/2017 | Meyer et al. | |
| 2017/0259095 | A1 † | 9/2017 | Pigeon | |
| 2018/0256929 | A1 | 9/2018 | Williams et al. | |
| 2019/0099630 | A1 | 4/2019 | Pigeon | |

FOREIGN PATENT DOCUMENTS

| | | | |
|---|---|---|---|
| GB | 532837 | A | 1/1941 |
| WO | 2009108944 | A2 | 9/2009 |
| WO | 2013148429 | A2 | 10/2013 |
| WO | 2017075070 | A1 | 5/2017 |

OTHER PUBLICATIONS

"Horizontal Sidewall Sprinkler in Lintels and Soffits", Minnesota Public Safety State Fir Marshal, Quick Response, Nov. 2012.
Reliable Sprinkler, Models DD56-6, DD56-27, DD80-6, DD80-27, D556, GP56, AH42, & AH56 Sprinklers: Specific Application Sprinklers for Attic Spaces, Bulletin 056 May 2019, www.reliablesprinkler.com, 26 pages.
Int'l Search Report and Written Opinion issued Aug. 12, 2020 in Int'l Application No. PCT/US2020/036115.
Int'l Preliminary Report on Patentabiliy issued Dec. 16, 2021 in Int'l Application No. PCT/US2020/036115.
Office Action issued Feb. 2, 2022 in Australian Application No. 202087113.
Models BB, SD, HIP, and AP "Specific Application Sprinklers for Protecting Attics", Tyco Fire & Building Products, Peak Performance, TFP610, 28 pages, Aug. 2007.
Int'l Preliminary Report on Patentability issued Aug. 18, 2020 in Int'l Application No. PCT/US2019/017028.
Viking Group Inc., Model V-BB Specific Application Attic Sprinkler, Technical Data, Form No. F_042915. Rev. 162, p. 65, 15 pages, Oct. 25, 2018.
Int'l Search Report and Written Opinion issued Apr. 15, 2019 in Int'l Application No. PCT/US2019/017028.
Office Action issued Mar. 8, 2022 in Indian Application No. 202017033045.
Written Opinion issued Feb. 24, 2022 in Singapore Application No. 11202112998S.
Office Action issued Mar. 23, 2022 in Chinese Application No. 201980013663 (Shown for relavance, no translation provided).
Woojingak (meeting) roof 3. Naver Blog, [online], Jul. 2021, [Search May 25, 2022], Internet:<URL:http://m.blog.naver.com/kenag/222427997309 (no translation available).
Office Action issued May 31, 2022 in Korean Application No. 10-2022-7000204 .
Office Action issued Jun. 20, 2020 in Chinese Application No. 201980013663.8.
Office Action issued Dec. 4, 2023 in KR Application No. 10-2020-7023561.

* cited by examiner
† cited by third party

FIRE PROTECTION SYSTEM FOR SLOPED COMBUSTIBLE CONCEALED SPACES

CROSS-REFERENCE TO RELATED APPLICATIONS

This application is a Section 371 of International Application No. PCT/US2019/017028, filed Feb. 7, 2019, which claims priority from U.S. Provisional Patent Application No. 62/630,313, titled "Sprinkler System for Sloped Combustible Concealed Spaces," filed Feb. 14, 2018, the entire contents of which are incorporated by reference herein.

BACKGROUND OF THE DISCLOSURE

The present disclosure relates generally to fire protection, and, more particularly, to fire protection systems for use in attics and combustible concealed spaces beneath pitched roofs.

Fire sprinkler systems, and the installation and operation thereof, are subject to nationally recognized codes and standards, such as NFPA 13, 13D and 13R, which are incorporated by reference herein. NFPA 13 and other standards require the use of equipment and components that have been independently tested by a recognized laboratory (e.g. UL or FM) to identify and verify their physical characteristics and performance.

An attic is the normally unoccupied, combustible concealed space between the ceiling of the uppermost occupied floor of a building and the pitched roof of the space. A particular problem arises with respect to fire protection in attics of buildings where the roof structures are pitched and are constructed of wooden joists and rafters or wooden trusses (hereinafter "structural members"). Namely, sprinkler selection and positioning options in an attic space thus far suffer from delayed activation and inefficient and exorbitant water consumption.

For example, with respect to standard spray (½" orifice/5.6 K factor) sprinkler systems in an attic space, NFPA (1) restricts their spacing to provide coverage areas of only 120 square feet per sprinkler and (2) imposes a hydraulic demand penalty (a required added area of expected sprinkler operation due to sloped ceilings greater than 2 inches per foot pitch) volume of water to be deliverable to a set number of sprinklers) of thirty percent even while retaining the light hazard, delivered water density requirement of 0.1 GPM/sq.ft. Moreover, an additional hydraulic demand penalty of thirty percent is imposed on dry sprinkler systems.

These rules and penalties do not address the real problem of delayed activation of standard spray sprinklers in an attic space, nor do they take building geometry and fire spread dynamics in view of the building geometry into account. For example, in attics, calculation of a design area (i.e., the most hydraulically demanding area of sprinkler operation), upon which sprinkler quantity, spacing and positioning is determined, does not take channels created by the structural members of the attic into account. Moreover, these rules and penalties do not address the downward conical spray pattern of standard spray sprinklers, which is not appropriately directed for protecting ceiling structure. Rather, these penalties merely assure a flood of inefficiently distributed water once the sprinklers are activated.

An alternative sprinkler system for an attic space involves positioning directional sprinklers along the ridgeline of an attic space, which spray water into the upper decking of the attic space. Such directional sprinklers with special distribution patterns direct the water mostly down the attic slope, but not very far laterally. Although relatively little water actually reaches the ignition location (if the fire is located in the eave) large amounts of water cools/wets the area where the flame would propagate to. The spray pattern thus limits the growth of the fire and typically the fire uses all the fuel available with minimal damage to the upper deck. Nonetheless, positioning of these sprinklers also abides by flawed rules and penalties. The narrow lateral spray pattern of these sprinklers also makes them subject to high numbers of activations when heat from a fire congregates near the peak attic areas, and the long downward (and narrow lateral) throw of these sprinklers makes them susceptible to small disruptions of spray pattern from any small asymmetries of the attic geometry, thereby requiring substantial water demand to compensate for the inefficiencies of long throw. Accordingly, a typical flow rate for this type of system is about 32 GPM per sprinkler, with an exorbitant total system demand of around 320 GPM for wet systems. Moreover, because the sprinklers are located solely along the ridgeline, there is a potential delay in sprinkler activation until the heat travels upwardly from the eave toward the peak. Such delay results in dangerous fire growth.

Therefore, it would be beneficial to provide greater flexibility in both sprinkler selection and positioning in attic and other combustible concealed spaces for more effective fire protection. For example, it would be beneficial to provide an economical alternative to standard spray sprinklers for the fire protection of attic and other sloped ceiling, combustible concealed spaces. It would also be beneficial to provide fire protection systems in attics and other sloped ceiling combustible concealed spaces utilizing sprinklers that are better positioned in relation to the fire origin location, that can provide quicker response times and that have spray distribution better suited for placement near common attic structural members, thereby accomplishing more efficient fire control.

BRIEF SUMMARY OF THE DISCLOSURE

Briefly stated, one aspect of the present disclosure is directed to a fire protection system for a combustible concealed space. The combustible concealed space includes a pitched roof constructed of a plurality of generally spaced apart structural members extending downwardly and outwardly from a ridgeline of the roof to an eave of the roof, the plurality of structural members defining respective channels therebetween. The fire protection system includes a first row of sprinklers nearest the ridgeline, the sprinklers being mounted to a first branch line extending generally parallel to the ridgeline. Each sprinkler is positioned within a respective channel. Consecutive sprinklers along the first row are spaced apart having no less than one channel therebetween without a sprinkler of the first row positioned therein. Consecutive sprinklers along the first row are spaced apart having no more than five channels therebetween without a sprinkler of the first row positioned therein. A second row of sprinklers is mounted to a second branch line extending generally parallel to the first branch line, the second row of sprinklers being positioned downslope from the first row of sprinklers. Each sprinkler of the second row is positioned within a respective channel. Consecutive sprinklers along the second row are spaced apart having no less than one channel therebetween without a sprinkler of the second row positioned therein. Consecutive sprinklers along the second row are spaced apart having no more than five channels therebetween without a sprinkler of the second row positioned therein. Each sprinkler of the second row is also placed within a different channel from each of the sprinklers of the first row, and a farthest number of channels between a sprinkler of the first row and a sprinkler of the second row is three channels without any sprinkler of the first row or sprinkler of the second row.

Another aspect of the present disclosure is directed to a method of positioning fire protection sprinklers in a combustible concealed space having a pitched roof constructed of a plurality of generally spaced apart structural members extending downwardly and outwardly from a ridgeline of the roof to an eave of the roof, and the plurality of structural members defining respective channels therebetween. The method includes a step of mounting a first row of sprinklers to a first branch line proximate the ridgeline and extending generally parallel to the ridgeline, wherein (i) each sprinkler is positioned within a respective channel, (ii) consecutive sprinklers along the first row are spaced apart having no less than one channel therebetween without a sprinkler of the first row positioned therein, and (iii) consecutive sprinklers along the first row are spaced apart having no more than five channels therebetween without a sprinkler of the first row positioned therein. The method also includes a step of mounting a second row of sprinklers to a second branch line extending generally parallel to the first branch line positioned downslope from the first branch line, wherein (i) each sprinkler of the second row is positioned within a respective channel, (ii) consecutive sprinklers along the second row are spaced apart having no less than one channel therebetween without a sprinkler of the second row positioned therein, (iii) consecutive sprinklers along the second row are spaced apart having no more than five channels therebetween without a sprinkler of the second row positioned therein, (iv) each sprinkler of the second row is placed within a different channel from each of the sprinklers of the first row; and (v) a farthest number of channels between a sprinkler of the first row and a sprinkler of the second row is three channels without any sprinkler of the first row or sprinkler of the second row.

BRIEF DESCRIPTION OF THE DRAWINGS

The following description of preferred embodiments of the disclosure will be better understood when read in conjunction with the appended drawings. It should be understood, however, that the invention is not limited to the precise arrangements and instrumentalities shown. In the drawings.

DETAILED DESCRIPTION OF THE DISCLOSURE

Figure 1:
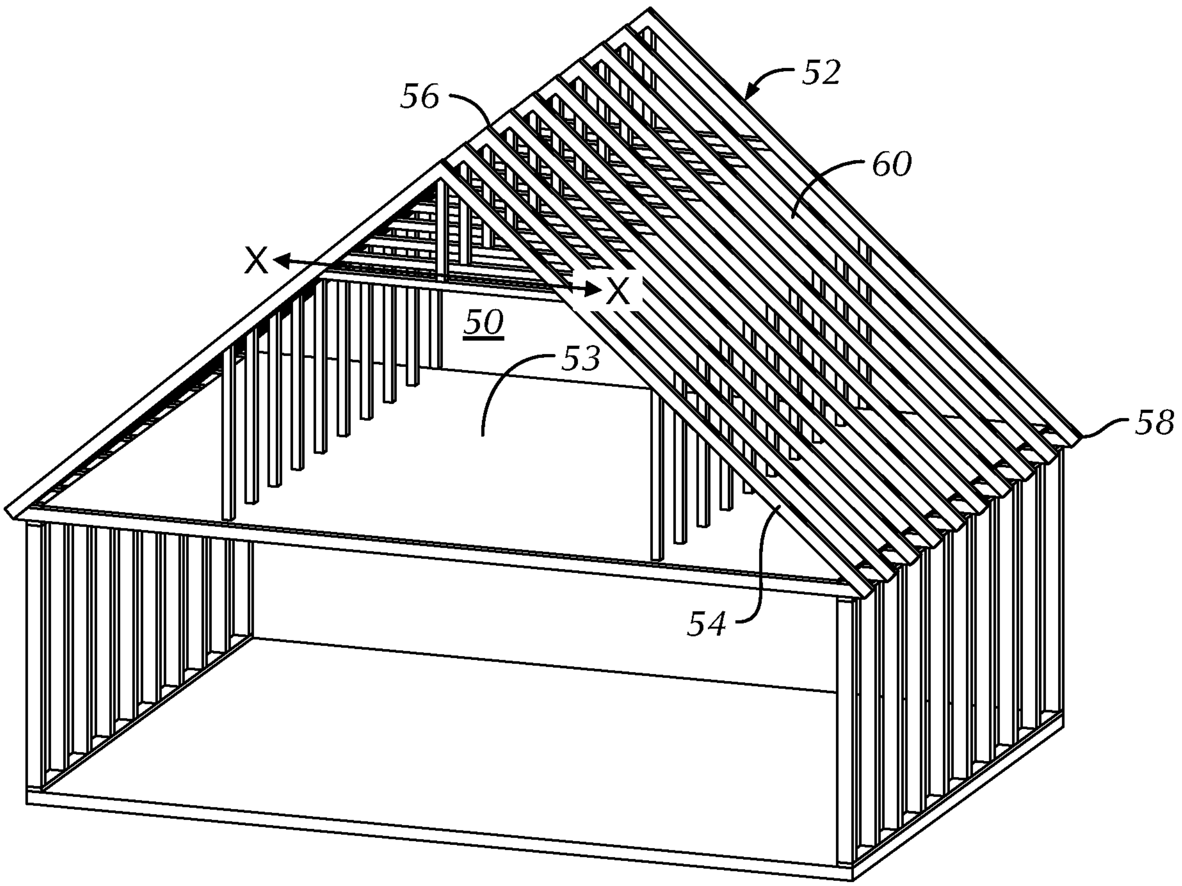
FIG. 1 is a perspective view of a combustible concealed space between the horizontal ceiling in the uppermost floor of an occupied building and the pitched roof thereof.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of an attic space or a sprinkler, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-11 a sprinkler system, generally designated 10, for an attic or a combustible concealed space with a pitched roof, in accordance with a preferred embodiment of the present disclosure. An attic space 50 generally includes a sloped or pitched roof 52 having, for example, a slope or pitch generally between about 2 in 12 (rise over run) and about 12 in 12. The pitched roof 52 is constructed of wooden joists and rafters or wooden trusses (hereinafter "structural members" 54) extending downwardly and outwardly from a ridgeline (peak) 56 of the roof 52 to an eave 58 of the roof 52, positioned nearest to, or intersecting with, the attic floor 53. Adjacent structural members 54 are generally spaced apart approximately thirty-six (36) inches or less on center, and generally approximately twenty-four (24) inches on center. The spacing between adjacent structural members 54 defines respective channels 60. Generally, a channel 60 is between approximately three (3) inches and six (6) inches deep, but could also be greater.

As should be understood by those of ordinary skill in the art, the ridgeline 56 is defined by the intersection of two adjoining portions of the roof 52, each extending downwardly and at least one extending outwardly from the ridgeline 56 to an eave 58. Commonly, there are two adjoining pitched portions of the roof 52, generally mirroring one another relative to the ridgeline 56 (see FIG. 1). For the sake of brevity, the following description will be directed to one pitched portion of the roof 52, but is substantially equally applicable to an opposing, generally mirrored pitch portion of the roof 52 when present.

The sprinkler system 10 comprises a plurality of sprinklers 12, 14 (shown schematically in FIGS. 2-4) spaced down the sloped roof 52. Namely, positioned below the roof 52 are at least two rows R1, R2 of sprinklers 12, 14 (FIG. 4), respectively, extending generally parallel to the ridgeline 56 and generally perpendicularly to the structural members 54. As should be understood by those of ordinary skill in the art, each row comprises a water branch line (13, 15) extending generally parallel to the ridgeline 56, with a plurality of spaced apart sprinklers 12, 14 arranged in series, projecting vertically upwardly or downwardly from the respective branch, or at another angle to achieve the preferred water spray distribution. Horizontal spacing (see FIG. 1, in the direction of axis X-X) between consecutive sprinkler rows (e.g., R1, R2) may be between approximately six (6) feet (72 inches) and approximately thirty-five (35) feet (420 inches) apart, such as, for example, between approximately six (6) feet and approximately sixteen (16) feet (192 inches) apart.

Figure 2:
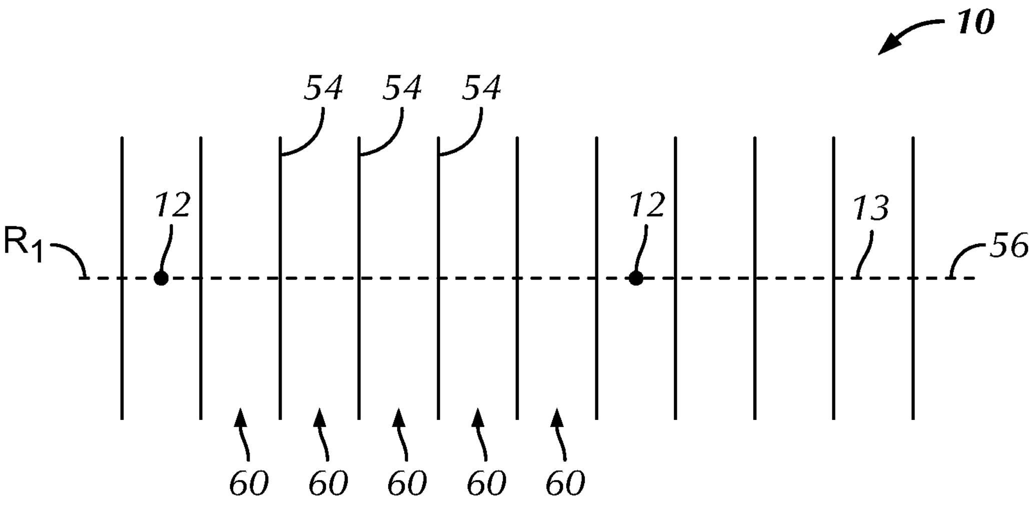
FIG. 2 is a schematic, partial plan view of a first row of sprinklers according to an embodiment of the present invention installed in the space of FIG. 1, showing the sprinklers along the first row being positioned a maximum distance apart.
Figure 3:
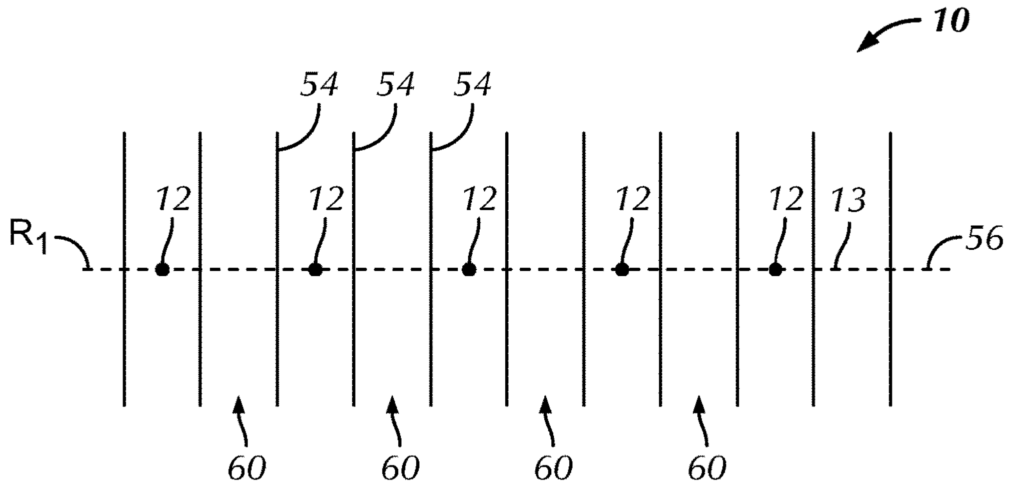
FIG. 3 is a schematic, partial plan view of a first row of sprinklers according to an embodiment of the present invention installed in the space of FIG. 1, showing the sprinklers along the first row being positioned a minimum distance apart.
Figure 4:
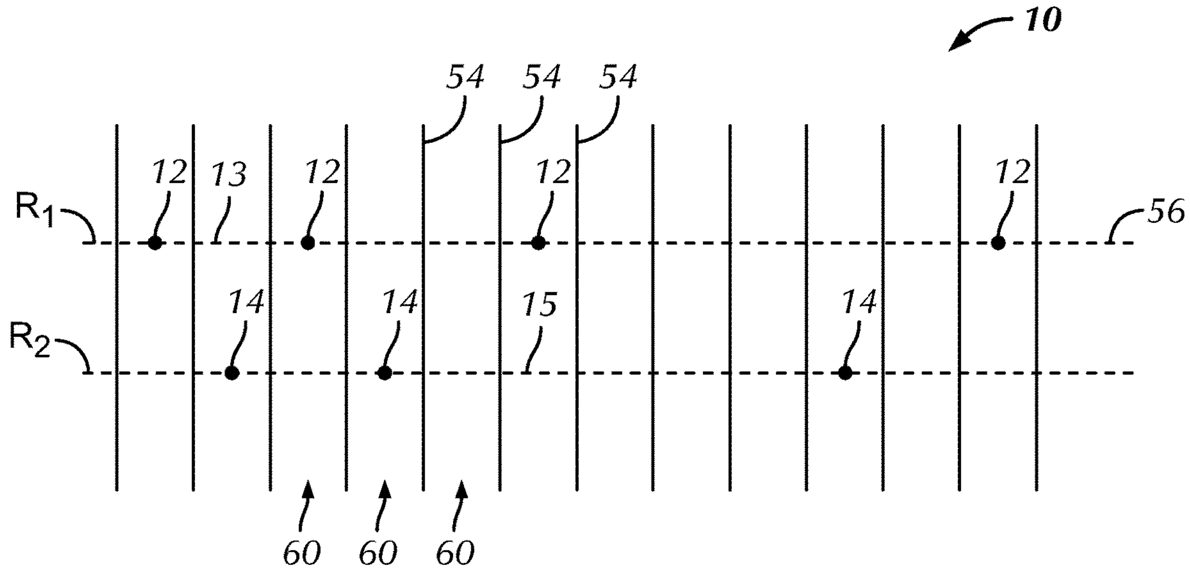
FIG. 4 is a schematic, partial plan view of a first row and second row of sprinklers according to an embodiment of the present invention installed in the space of FIG. 1, showing positioning of the sprinklers of the second row relative to the sprinklers of the first row.
Figure 5B:
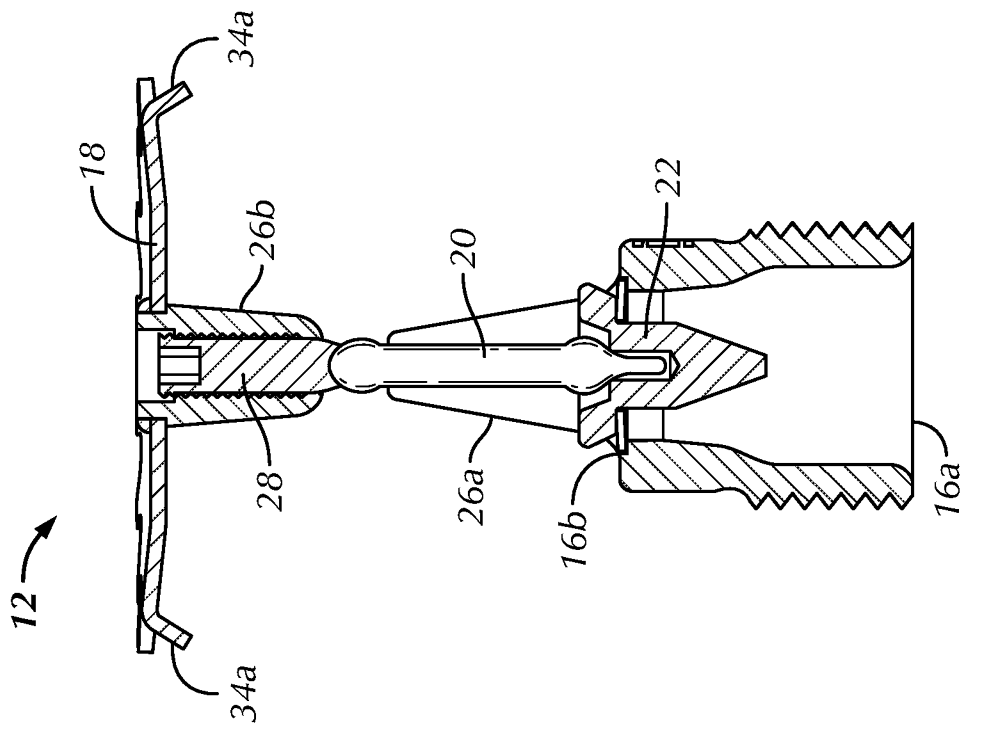
FIG. 5B is a cross-sectional elevational view of the sprinkler of FIG. 5A, taken along sectional line **5*b*-5*b* of FIG. 5**A.
Figure 5A:
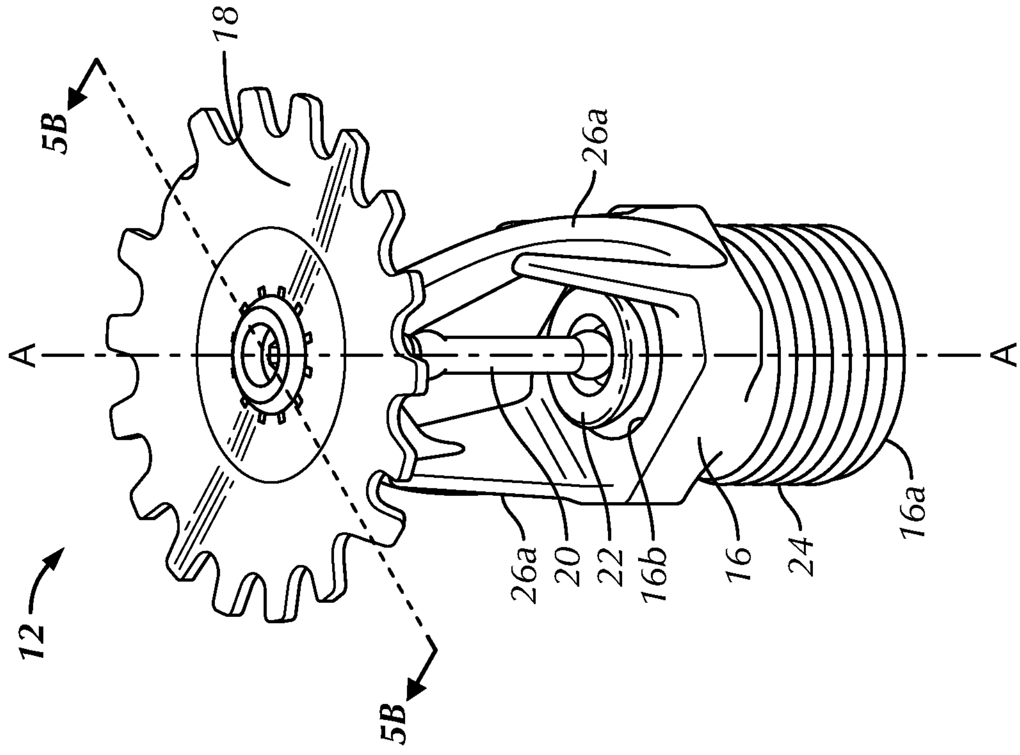
FIG. 5A is a top, front and side perspective view of a sprinkler mounted along the first row of sprinklers.

As shown in FIGS. 2-4, the first row R1 is the row nearest the ridgeline 56 (and furthest from the eave 58). Generally, row R1 is located horizontally within approximately twenty-four (24) inches of the ridgeline 56, such as, for example, eighteen (18) inches, twelve (12) inches or six (6) inches of the ridgeline 56. As should be understood by those of ordinary skill in the art, the first row R1 may be generally coaxial with the ridgeline 56. The second row R2 extends generally parallel to the first row R1 and comprises the next consecutive, i.e., adjacent, branch line 15 of sprinklers 14. The second row R2 is positioned downslope from the first row R1 (relative to the pitched roof 52 of the attic space 50). As shown in the schematic, partial plan views of an attic space 50 in FIGS. 2-4, each sprinkler 12, 14 (of every row of sprinklers) is purposely positioned within a channel 60, i.e., aligned between two adjacent structural members 54 (see FIGS. 2-4).

Along the first row R1 (as well as along any other row of sprinklers 12, 14), adjacent, i.e., consecutive, sprinklers 12 are spaced having a maximum of five channels 60 therebetween (see FIG. 2). That is, there are no more than five consecutive channels 60 without a sprinkler 12 along the first row R1 of sprinklers 12. Along the first row R1, adjacent sprinklers 12 are also spaced having a minimum of one channel 60 therebetween (see FIG. 3). That is, there are no sprinklers 12 in consecutive channels 60 along the first row R1 (see FIGS. 2-4). Stated differently, the sprinklers 12 of row R1 may be positioned with one, two, three, four, or five consecutive unsprinklered channels 60 between adjacent sprinklers 12. As should be understood by those of ordinary skill in the art, spacing between consecutive sprinklers 12 may be uniform along a row of sprinklers 12, or, alternatively may vary along a row within the aforementioned range due to a variety of factors, such as, for example, without limitation, interfering structural features in the attic space 50. As will be explained in more detail below (with respect to the distribution pattern of the sprinklers 12), row R1 may be utilized to protect an attic space 50 spanning approximately sixteen (16) feet from peak 56 to eave 58 (i.e., thirty-two (32) feet from eave 58 to eave 58 where applicable), and preferably spanning twelve (12) feet from peak 56 to eave 58 (i.e., twenty-four (24) feet from eave 58 to eave 58 where applicable). Alternatively, row R1 may be utilized to protect an attic space 50 spanning approximately thirty-five (35) feet from peak 56 to eave 58 (i.e., seventy (70) feet from eave 58 to eave 58 where applicable).

Turning to row R2 (employed for attic spaces 50 spanning greater than thirty-five feet from peak 56 to eave 58, and generally for attic spaces 50 spanning greater than sixteen feet from peak 56 to eave 58), the sprinklers 14 of row R2 are positioned relative to one another (along the same row) according to the conditions of row R1. While abiding by the positioning conditions of row R1, the sprinklers 14 of row R2 are also all offset from the sprinklers 12 of row R1. Namely, as shown in FIG. 4, none of the sprinklers 14 in the second row R2 are positioned within the same channel 60 as a sprinkler 12 of row R1. The closest a sprinkler 14 of row R2 is positioned relative to a sprinkler 12 of row R1 (along the axis of the rows) is in an adjacent channel 60 from the channel 60 in which a sprinkler 12 of row R1 is positioned (see FIG. 4). The farthest a sprinkler 14 of row R2 is positioned from a sprinkler 12 of row R1 (along the axis of the rows) is a maximum of three unsprinklered channels 60 therebetween (see FIG. 4).

As previously explained, row R2 is positioned downslope from row R1, and horizontally spaced therefrom by between approximately six (6) feet and approximately thirty-five (35) feet. Employing rows R1 and R2 may be utilized to protect an attic space 50 spanning a maximum of seventy-five (75) feet from peak 56 to eave 58 (i.e., one hundred and fifty (150) feet from eave 58 to eave 58). Sprinklers 14 (or 12) of any subsequent downslope row are spaced relative to one another (along the same row) according to the conditions of row R1, and are offset relative to the adjacent upslope row (i.e., the previous row closer to the ridgeline 56) according to the offset conditions of row R2 relative to row R1. Horizontal spacing of any such subsequent downslope row from the previous upslope row of is also between approximately six (6) feet and approximately thirty-five (35) feet.

Typically, the most challenging fires to reach with sprinklers start at the bottom of an attic space 50 (near the eave 58), and in the more common types of attic structures where the structural members 54 and the channels 60 extend down the attic slope (from the peak 56), the fire propagates up one or more of the channels 60. Heat and fire growth in an attic space 50 are directly related to the sloping structure and the channels 60 formed by the structural members 54. In these downslope channel type attic structures, fires generally propagate laterally, i.e., across channels 60, no more than a single channel 60 (between approximately eighteen inches and thirty-six inches wide, and generally approximately twenty-four inches wide) during the early stages of fire development. Therefore, to be most efficient, the focus of sprinkler operation should be prioritized downslope in the direction along the channels 60 of the pitched roof 52 before the lateral direction. By addressing and suppressing the fire ignition location early in the development of a fire, with sprinklers 12, 14 positioned for better efficiency of water delivery, much less water can be utilized to dispose of the fire.

Due to the channeling effect and upward heat propagation, staggering sprinklers 12, 14 ensures there will be a sprinkler 12, 14 positioned within one or two channels 60 away from any fire propagation location, and a fire plume will be sure to activate a sprinkler 12, 14 in a nearby channel 60 between eave 58 and peak 56. Advantageously, offsetting, i.e., staggering/spacing, the sprinklers 12, 14 with respect to the channels 60 between the structural members allows for much faster activation of a sprinkler 12, 14 close to a fire and more effective sprinkler 12, 14 spray distribution, regardless of where the initial fire location is generated. Spacing the sprinklers 12, 14 relative to the channels 60, as described above, ensures that a sprinkler 12, 14 is located laterally, or along a channel 60, within the range where the hot gasses of a fire may be channeled. By spacing the sprinklers 12, 14 in the above described manner, the sprinklers 12, 14 are effectively placed to ensure quick activation during the beginning phases of a fire and better positioned for more efficient spray distribution, thereby utilizing significantly less water to dispose of the fire. Advantageously, via the above-described sprinkler positioning system, no more than five sprinklers 12 activate during a fire, and, therefore, the total system demand can be kept to between approximately eighty (80) and approximately one-hundred (100) GPM, which is less than half of the traditional "attic sprinkler" total system demand. This allows for the use of the present system in buildings where the current sprinkler demand makes attic systems not cost effective. Moreover, cold soldering (when water spray from one sprinkler falls upon an adjacent sprinkler and prevents the heat-sensitive element of the adjacent sprinkler from operating) is substantially prevented.

As should be understood, sprinkler configuration, in addition to sprinkler positioning, also contributes to effective fire protection in attic spaces 50. In one embodiment, as described in further detail below, the sprinklers 12 along row R1 (i.e., the row nearest the ridgeline 56) may be of one configuration and the sprinklers 14 along row(s) R2-R(n) (i.e., the rows downslope from the ridgeline 56) may be of another configuration, but the disclosure is not so limited. For example, where a row of sprinklers is employed at the eave 58, the sprinklers may be configured similarly to the sprinklers 12 along row R1. As previously explained, the focus of sprinkler operation in attic spaces 50 should be prioritized downslope in the direction along the channels 60 of the pitched roof 52 to be most efficient.

As shown, FIGS. 5A-6B illustrate an embodiment of the sprinklers 12 mounted along row R1, but the disclosure is not so limited. In one embodiment, the sprinkler 12 is mounted to project upwardly from the water branch line 13 (either perpendicularly to the branch line 13, or at an upward angle relative thereto), but the disclosure is not so limited. The sprinkler 12 includes a sprinkler frame 16, a fluid deflector 18, and a thermal trigger (i.e., heat-sensitive element) 20 supporting a seal assembly/plug 22 to seal the sprinkler 12 in an unactuated configuration. The sprinkler frame 16 defines a proximal inlet 16*a*, a distal outlet 16*b*, and an internal water passageway extending therebetween which defines a sprinkler axis A-A. In the illustrated embodiment, the thermal trigger 20 takes the form of a glass-bulb type trigger disposed and axially aligned along the sprinkler axis A-A, but the disclosure is not so limited.

The sprinkler frame 16 includes an at least partially externally threaded body 24, defining the proximal inlet 16*a*, the distal outlet 16*b* and the internal water passageway extending therethrough, which receives at least a portion of the sealing plug 22. The body 24 is mounted to, e.g., threadingly, the water line branch defining row R1 to receive water therefrom and through the internal water passageway through the body 24. Two frame arms 26*a* are radially positioned or diametrically opposed about the body 24 and extend axially therefrom toward the deflector 18. The frame arms 26*a* converge toward the sprinkler axis A-A to terminate at a terminal end 26*b* of the sprinkler frame 16 axially aligned along the sprinkler axis A-A. The deflector 18 is mounted upon the terminal end 26*b* of the sprinkler frame 16.

A compression screw 28 (FIG. 5B), or the like, secures the thermal trigger 20 upon the sealing plug 22, in a manner well understood by those of ordinary skill in the art. The thermal trigger 20, via the compression screw 28, applies pressure to the sealing plug 22 (greater than the opposing water pressure on the sealing plug 22 from the fluid in the branch line) to prevent water (from the branch line) from flowing out of the body 24 until the ambient temperature around the sprinkler 12 reaches the activation temperature, at which time the thermal trigger 20 is triggered/activated. Upon activation of the thermal trigger 20, e.g., shattering of the glass bulb, the sealing plug 22 is forced out by the upstream pressurized water and deflected away. The water sprays out from the water passageway in the body 24 and impacts the deflector 18 for distribution thereof in a desired spray pattern according to the design of the deflector 18.

Figure 6A:
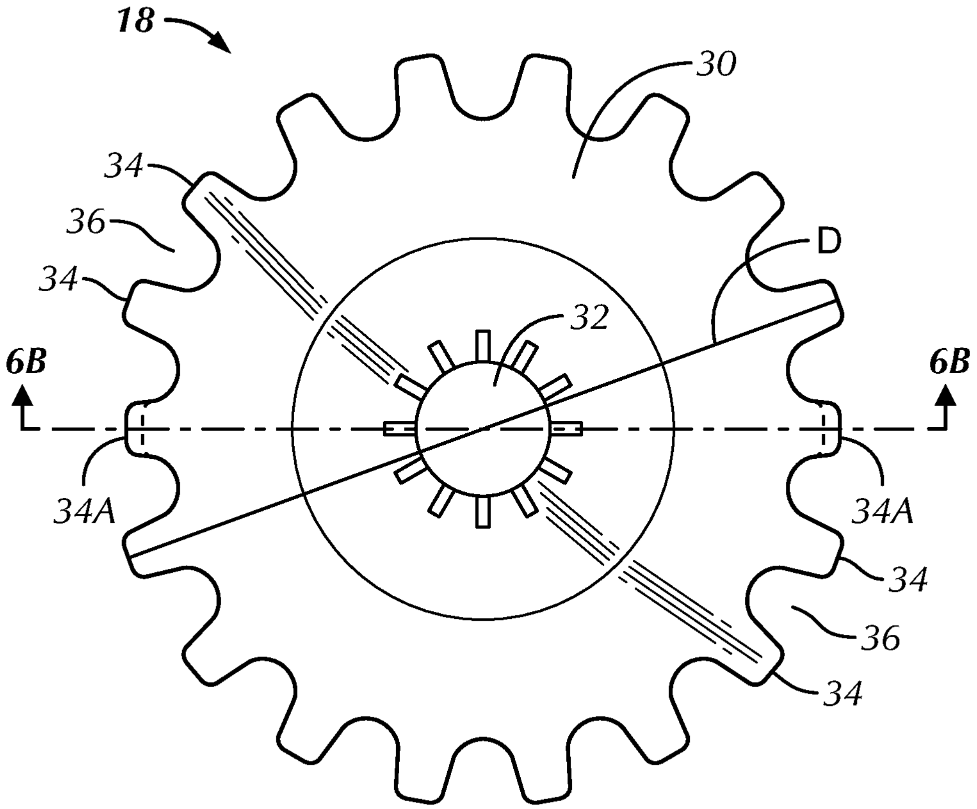
FIG. 6A is a top plan view of the deflector of the sprinkler of FIG. 5A.
Figure 6B:
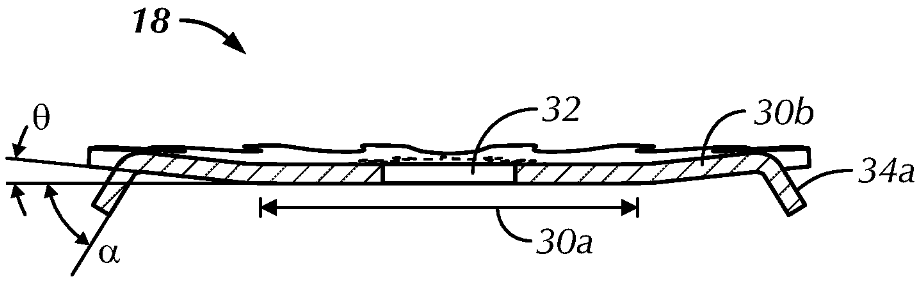
FIG. 6B is a cross-sectional elevational view of the deflector of FIG. 6A, taken along sectional line A-A of FIG. 6A.
Figure 7:
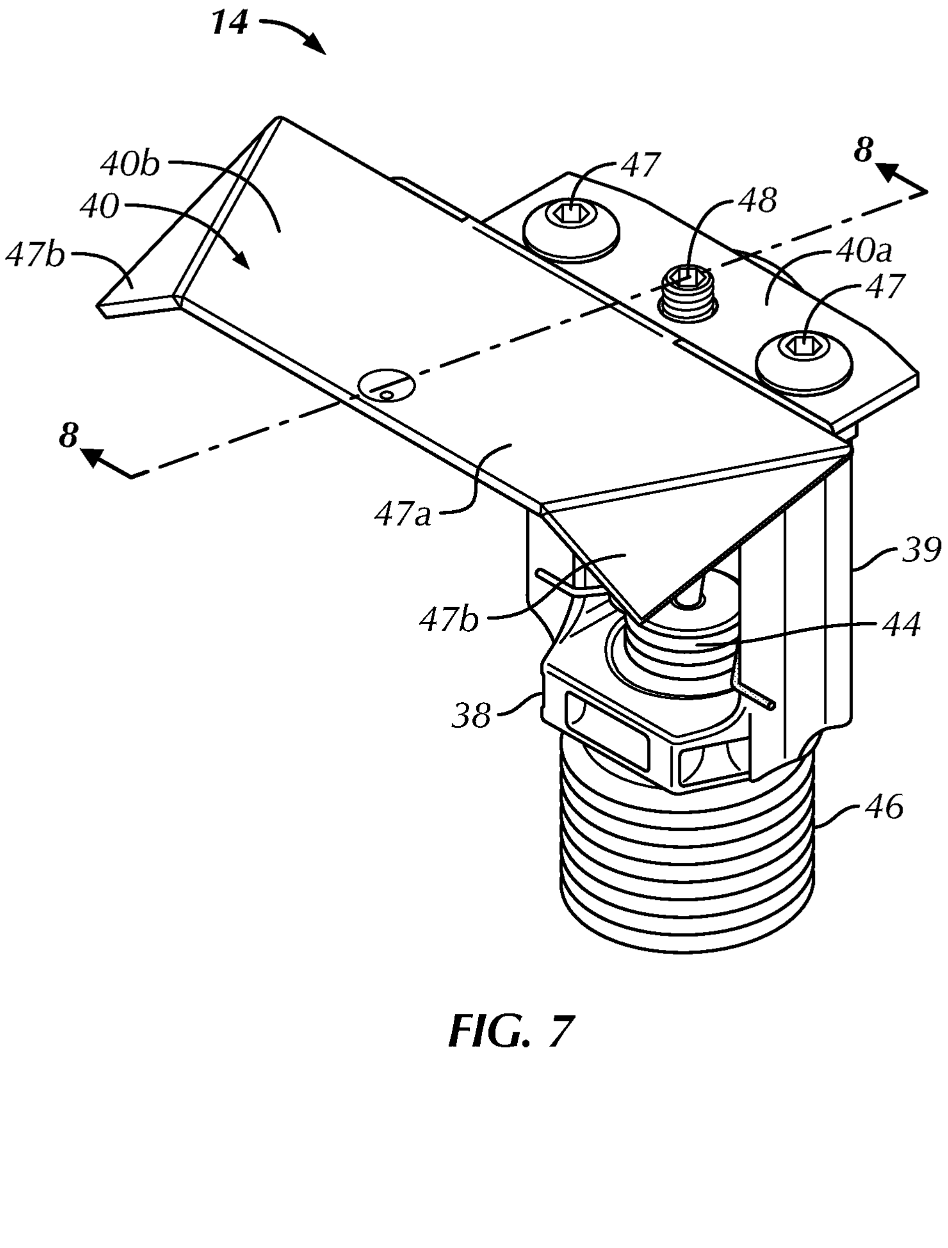
FIG. 7 is a top, front and side perspective view of a sprinkler mounted along the second row of sprinklers.

Turning to FIGS. 6A-6B, the deflector 18, in the illustrated embodiment, is designed for spray distribution in a generally elliptical pattern, such as, for example, a circular pattern. In one embodiment, the pressurized water is projected by the deflector 18 up to approximately twenty-four (24) feet in diameter, i.e., twelve (12) feet in every direction. As shown in FIG. 6A, the deflector 18 comprises a generally circular body 30 defining a diameter D. The deflector 18 includes a generally circular, generally flat, mounting aperture 32, for mounting to the terminal end 26*b* of the sprinkler frame 16. The deflector 18 includes a plurality of angularly spaced tines 34 about the periphery thereof, which define a plurality of slots 36 therebetween. In the illustrated embodiment, the deflector 18 includes eighteen (18) substantially equally dimensioned and substantially equally spaced tines 34, and eighteen (18) substantially equally dimensioned and substantially equally spaced slots 36, but the disclosure is not so limited.

As shown best in FIG. 6B, the body 30 of the deflector 18 includes a radially inner portion 30*a*, defining the mounting aperture 32 therein, and a concentric radially outer portion 30*b* integral with the inner portion 30*a*. As shown, the radially outer portion 30*b* is angled upwardly, i.e., away from the sprinkler frame 16, by an angle $\theta$ relative to the radially inner portion 30*a*. In one embodiment, the angle $\theta$ is approximately 5°, resulting in a high, top projection angle of water, but the disclosure is not so limited. Stated differently, in addition to conventional water distribution at substantially all downward angles below the deflector 18, the upward projection angle $\theta$ enables the water spray pattern to have a high projection, lofting the water spray closer to the attic structure above the sprinkler 12.

As also shown best in FIG. 6B, at least one pair of diametrically opposed tines 34*a* of the tines 34 of the deflector 18 are angled downwardly, i.e., toward the sprinkler frame 16, by an angle $\alpha$ relative to the radially inner portion 30*a* of the body 30. In one embodiment, the angle $\alpha$ is approximately 60°, but the disclosure is not so limited. The sprinkler 12 is mounted to a water branch line 13 such that the tines 34*a* are oriented substantially transverse to the branch line. Accordingly, water sprayed by one sprinkler 12 in a direction substantially transverse to the branch line 13 is deflected away from sprinklers in the adjacent branch line 15 after contacting the tines 34*a*. Consequently, cold soldering is minimized as water that is deflected transverse from the branch line 13 is, therefore, also deflected away from the sprinklers 14 along the adjacent branch line 15.

As should be understood by those of ordinary skill in the art, a fire heat plume travels predominantly up the slope from the origin of the fire toward the peak 56 in an attic space 50. Where the structural members 54 extend in the direction from the peak 56 to the eave 58, forming the channels 60 therebetween, the heat plume exhibits less rapid sideways/lateral spread across the channels 60 and more rapid and concentrated upslope spread. Wider spread is exhibited in areas where the structural members 54 extend laterally across the slope of the pitched roof 52, but the heat flow is nevertheless predominantly upslope. Heat from a fire ultimately accumulates at the peak 56, and a heat layer develops that is thickest directly upslope from the origin of the fire.

One advantage of the generally circular spray distribution of the sprinklers 12 is the wide projection pattern/coverage area thereof. Accordingly, when the sprinklers 12 along row R1 are activated, they provide a relatively wide area cooling effect, protecting wide areas of the peak 56 of the attic space 50 from fire growth. Moreover, the wide projection pattern of the sprinklers 12 also limits concentrated heat plume rise along a channel 60, up the slope of the roof 52 from the origin of a fire, forcing the heat plume downslope and increasing sideways/lateral movement of the heat plume. Forcing a fire heat plume downslope and more laterally/sideways, facilitates activation of the nearest downslope sprinklers 14 (described in further detail below) of a subsequent row R2 or rows, closer to the fire. Additionally, the generally circular spray distribution of the sprinklers 12 along row R1 permits the sprinklers 12 to respond to fires from either downslope side of the attic space 50. Alternatively, the advantages of the generally circular spray distribution (wide peak area cooling and increased sideways plume projection downslope) may be achieved with a slightly elliptical pattern for better peak cooling or better downslope plume projection.

The sprinklers 12 may also be employed in a row nearest the eave 58, whereby the wide coverage area thereof may more efficiently reach restricted space at the intersection of the pitched roof 52 and the attic floor 53. At an eave 58, the sprinklers 12 spray reach far into the narrow crevice at the insertion. The sprinklers 12 may also be employed in areas of the attic space 50 where the structural members 54 extend perpendicularly to, i.e. laterally across, the slope of the pitched roof 52, e.g., a hip area, whereby heat rising toward the peak 56 exhibits increased lateral spread due to the direction of the structural members 54.

Turning to FIGS. 7-11, an embodiment of the sprinklers 14 mounted along row R2 is illustrated, but the disclosure is not so limited. Similarly to the sprinkler 12 (FIGS. 5A-6B), the sprinkler 14 includes a sprinkler frame 38, a fluid deflector 40, and a thermal trigger 42 (i.e., heat-sensitive element) supporting a seal assembly/plug 44 to seal the sprinkler 14 in an unactuated configuration. The sprinkler frame 38 defines a proximal inlet 38*a*, a distal outlet 38*b*, and an internal water passageway extending therebetween which defines a sprinkler axis B-B. In the illustrated embodiment, the thermal trigger 42 takes the form of a glass-bulb type trigger disposed and axially aligned along the sprinkler axis B-B, but the disclosure is not so limited.

The sprinkler frame 38 includes an at least partially externally threaded body 46, defining the proximal inlet 38*a*, the distal outlet 38*b* and the internal water passageway extending therethrough, which receives at least a portion of the sealing plug 44. The body 46 is connected, e.g., threadingly, with a water branch line 15 defining row R2 to receive water therefrom. Two frame arms 39 are radially positioned or diametrically opposed about the body 46 and extend axially therefrom toward the deflector 40. A compression screw 48 (FIG. 8), or the like, secures the thermal trigger 42 upon the sealing plug 44, in a manner well understood by those of ordinary skill in the art.

Figure 9:
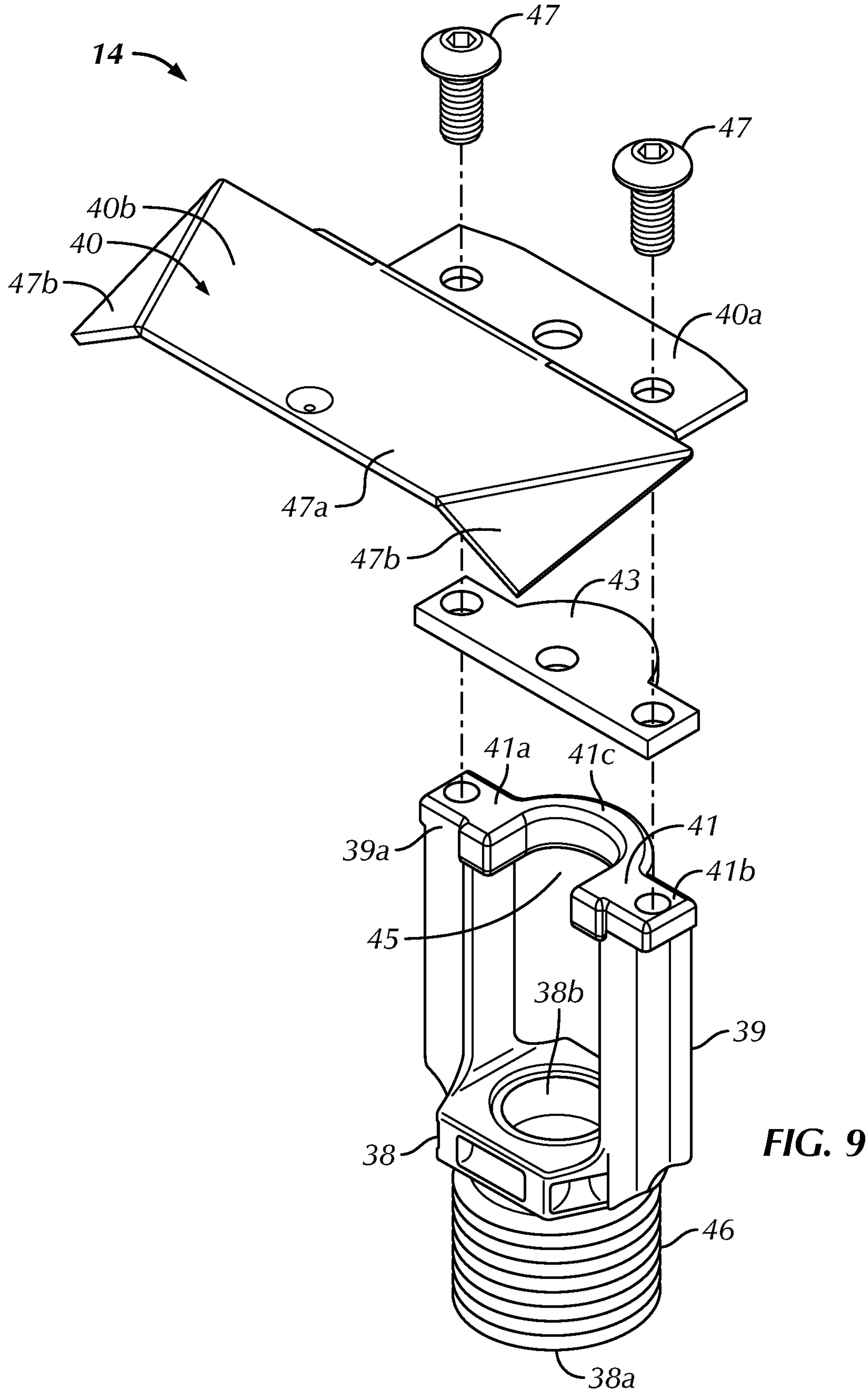
FIG. 9 is an exploded view of the sprinkler of FIG. 7, without the thermal trigger thereof.
Figure 10:
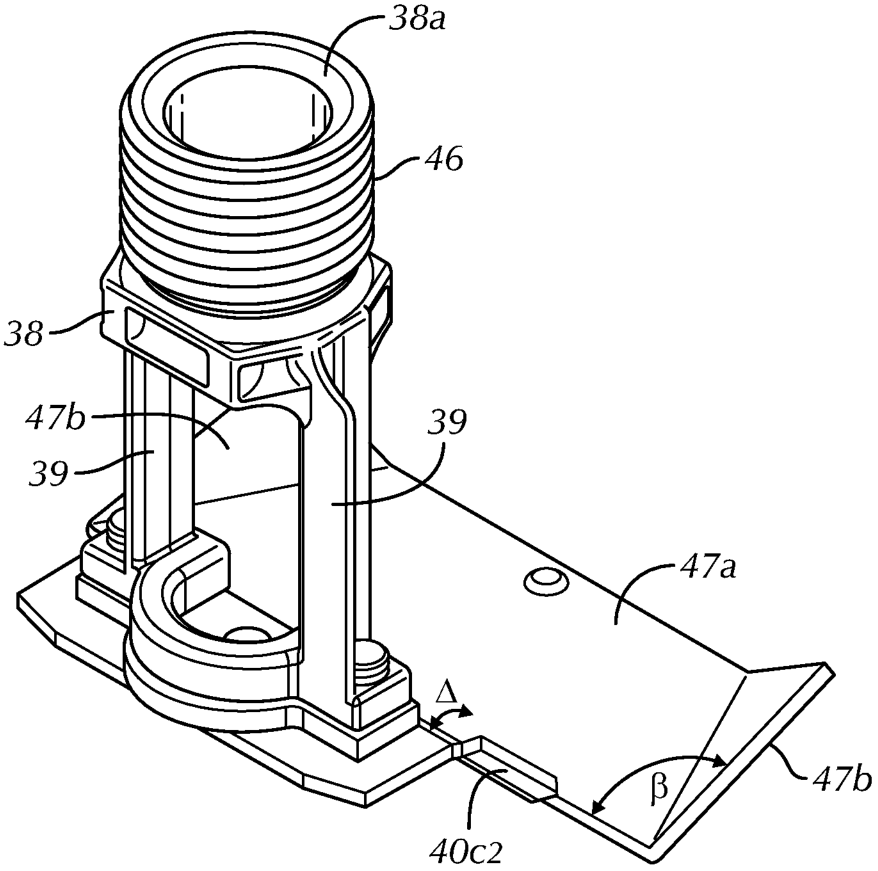
FIG. 10 is a bottom, rear and side perspective view of the sprinkler of FIG. 7, without the thermal trigger thereof.

As shown best in FIG. 9, the frame arms 39 extend axially away from the body 46, substantially parallel to one another, to respective terminal ends 39*a*. A generally planar cross-bar 41 extends between and connects the terminal ends 39*a*, and is oriented generally perpendicular to the axis B-B. The cross-bar 41 defines a first section 41*a* upon the terminal end 39*a* of a frame arm 39, a second section 41*b* upon the terminal end 39*a* of the other frame arm 39, and a U-shaped third section 41*c* therebetween, defining a U-shaped opening 45 between the terminal ends 39*a* of the frame arms 39. The U-shaped opening 45 is generally in axial registry with the water passageway extending through the body 46. A generally planar spacer bar 43, oriented generally parallel to the cross-bar 41, is mounted upon the cross-bar 41 and covers the top of the U-shaped opening 45.

In one configuration, the sprinkler 14 is mounted on the row R2 with the axis B-B thereof oriented generally perpendicularly to the pitched roof 52, and with the deflector 40 facing downslope. Alternatively, the sprinkler 14 may be mounted with the axis B-B thereof oriented generally perpendicularly to the ground surface. Upon activation of the thermal trigger 42, e.g., shattering of the glass bulb, the sealing plug 44 is forced out by the upstream pressurized water from the branch line 15 and deflected away. The water sprays out from the water passageway in the body 38 and impacts the deflector 40 for distribution thereof in a desired spray pattern according to the design of the deflector 40. The combination of the U-shaped opening 45 and the covering spacer bar 43 deflects some pressurized water reaching the opening 45 a small distance upslope. In one embodiment, for example, the pressurized water is projected between approximately two (2) feet and approximately six (6) feet upslope, such as, for example four (4) feet, but the disclosure is not so limited.

The sprinkler 14 is designed, however, primarily for areas downslope from the peak 56, where heat plumes are channeling up the slope. As should be understood, there is minimal heat projection from a fire in the downslope direction in an attic space 50, and primarily upslope projection of heat from the fire. Accordingly, the deflector 40 is designed to cause extensive downslope water projection compared to the upslope water projection. Employing sprinklers 14 that project water primarily downslope also allows for increased sprinkler spacing up the slope. Sprinklers 12 positioned in an attic space 50 predominantly detect fires that are downslope therefrom, and, therefore, a primarily downslope spray pattern of the sprinklers 14 serves best to extinguish any fire detected by the sprinkler 12.

Figure 8:
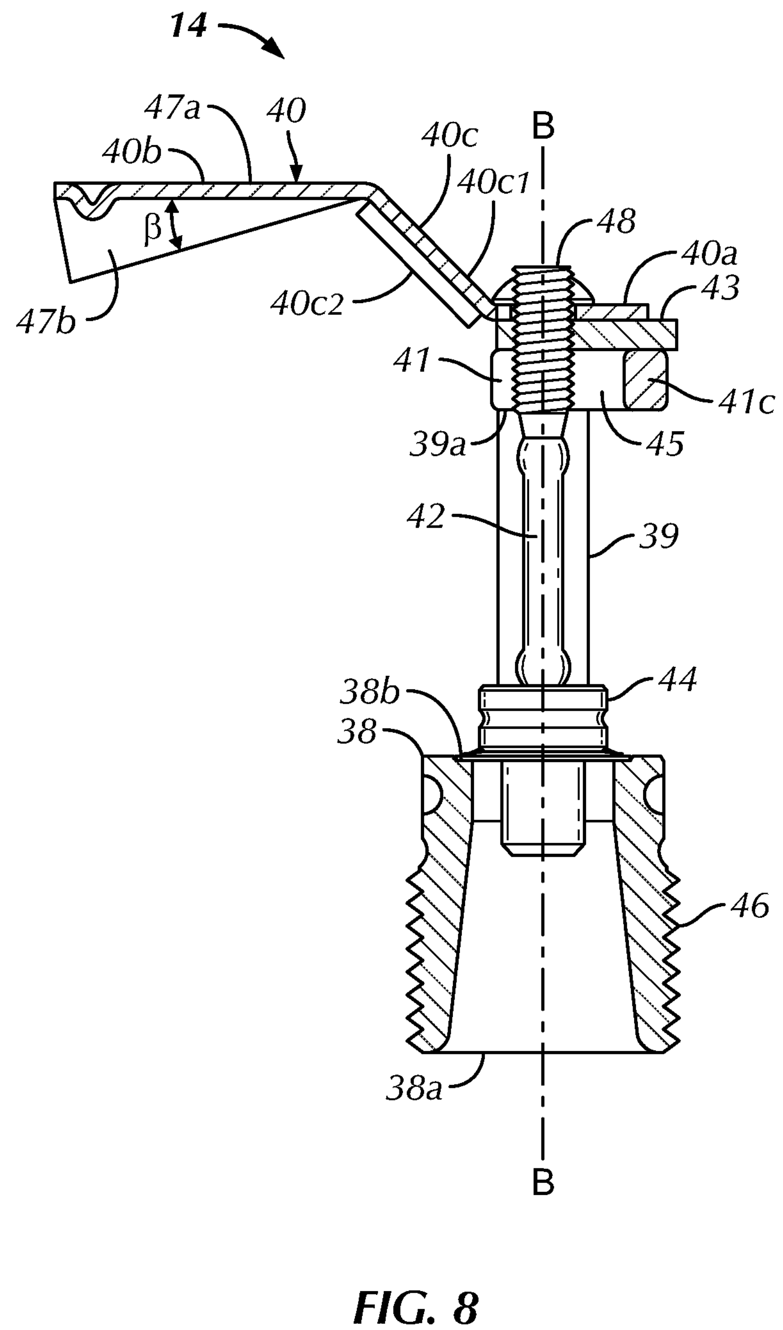
FIG. 8 is a cross-sectional elevational view of the sprinkler of FIG. 7, taken along sectional line 8-8 of FIG. 7.
Figure 11:
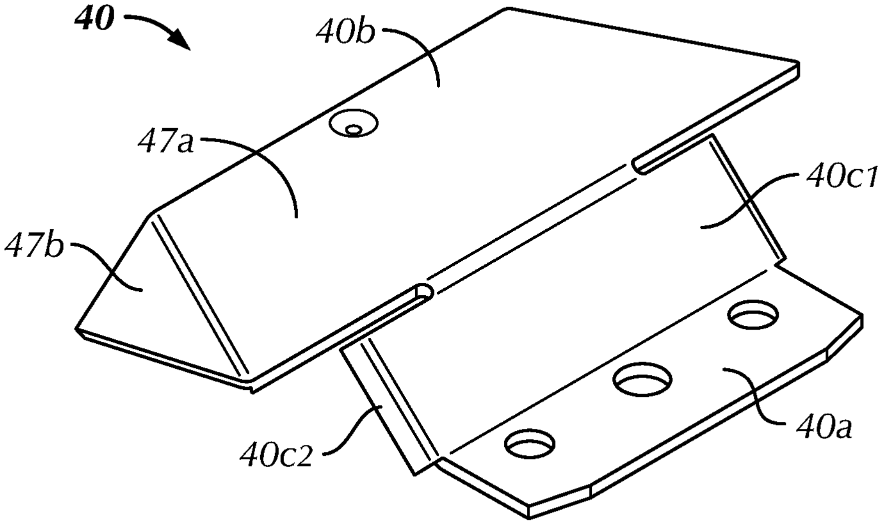
FIG. 11 is a top, rear and side perspective view of the deflector of the sprinkler of FIG. 7.

As shown best in FIGS. 8, 9 and 11, the deflector 40 includes a generally planar mounting portion 40*a*, oriented generally perpendicularly to the axis B-B and generally parallel to the spacer bar 43. The mounting portion 40*a* is mounted upon the spacer bar 43, e.g., via fastening screws 47, in a manner well understand by those of ordinary skill in the art. As shown best in FIG. 8, the compression screw 48 is threaded through complementary apertures in the mounting portion 40*a* and the spacer bar 43, through the U-shaped opening 45 to abutting the thermal trigger 42.

The deflector 40 further includes a deflecting portion 40*b*, having a generally planar, middle section 47*a* (as described in further detail below) oriented generally parallel to the mounting portion 40*a* and spaced further away from the sprinkler frame 38 than the mounting portion 40*a*. A connecting portion 40*c* connects the mounting portion 40*a* with the deflecting portion 40*b*.

The combination of the spacer bar 43, and the connecting and deflecting portions 40*c*, 40*b* of the deflector 40 projects the majority of water downslope. As shown best in FIGS. 8, 10 and 11, the connecting portion 40*c* includes a generally planar middle section 40*c*1 and two opposing peripheral sections 40*c*2 extending from the middle section 40*c*1 at an included angle A (relative to the middle section 40*c*1). In one embodiment, the middle section 40*c*1 of the connecting portion 40*c* is generally rectangular and the peripheral sections 40*c*2 are also rectangular in shaped. In one embodiment, the middle section 40*c*1 is angled at approximately 45° relative to each of the mounting portion 40*a* and the deflecting portion 40*b*, but the disclosure is not so limited. In one embodiment, the peripheral sections 40*c*2 are angled downward from the middle section 40*c*1 toward the sprinkler frame 38, and the angle A is approximately 45°, but the disclosure is not so limited.

The deflector portion 40*b* also includes the generally planar middle section 47*a* and two opposing peripheral sections 47*b* extending from the middle section 47*a* at an included angle β (relative to the middle section 47*a*). As shown best in FIGS. 9 and 11, the middle section 47*a* is trapezoidal in shape and the peripheral sections 47*b* are triangular in shaped. The peripheral sections 47*b* are angled downward from the middle section 47*a* toward the sprinkler frame 38. In one embodiment, the angle β is approximately 52°, but the disclosure is not so limited.

As indicated above, the connecting and deflecting portions 40*c*, 40*b* of the deflector 40 channel water downslope. The peripheral sections 40*c*2 of the connecting portion 40*c* resist spillage of water sideways at the zone of the deflector 40 first struck by water projected from sprinkler frame 38. The peripheral sections 47*b* of the deflecting portion 40*b* are angled further away from the deflector 40 relative to the peripheral sections 40*c*2 of the connecting portion 40*c* and project the water across the width of the heat affected channeled zone from the fire traveling up the slope. In one embodiment, for example, the pressurized water is projected up to approximately forty (40) feet downslope, such as, for example, twenty (20) feet downslope, and having a spray width of approximately eight (8) feet, i.e., four (4) feet to each side, but the disclosure is not so limited. That is, the width of spray of the deflector 40 covers approximately four (4) channels 60, i.e., two (2) channels 60 on each side. Alternatively, the width of spray of the deflector 40 may cover approximately two and a half (2.5) channels 60 or three (3) channels 60 to each side. In one embodiment, between approximately 20% and approximately 40% of the water is projected upslope and between approximately 60% and approximately 80% of the water is projected downslope, but the disclosure is not so limited.

It will be appreciated by those skilled in the art that changes could be made to the embodiment(s) described above without departing from the broad inventive concept thereof. It is understood, therefore, that this invention is not limited to the particular embodiments disclosed, but it is intended to cover modifications within the spirit and scope of the present disclosure, as set forth in the appended claims.

We claim:

1. A fire protection system for a combustible concealed space, the combustible concealed space comprising:

a pitched roof constructed of a plurality of generally spaced apart structural members extending downwardly and outwardly from a ridgeline of the roof to an eave of the roof, the plurality of structural members defining respective channels therebetween, and the fire protection system comprising:

a first row of sprinklers nearest the ridgeline, the sprinklers being mounted to a first branch line extending generally parallel to the ridgeline, wherein:

(i) each sprinkler is positioned within a respective channel, (ii) consecutive sprinklers along the first row are spaced apart having no less than one channel therebetween without a sprinkler of the first row positioned therein, (iii) consecutive sprinklers along the first row are spaced apart having no more than five channels therebetween without a sprinkler of the first row positioned therein, (iv) a plurality of the sprinklers along the first row include respective first fluid deflectors, the first fluid deflector being configured to produce a first spray distribution pattern, and;

a second row of sprinklers mounted to a second branch line extending generally parallel to the first branch line, the second row of sprinklers being positioned downslope from the first row of sprinklers, wherein:

(i) each sprinkler of the second row is positioned within a respective channel, (ii) consecutive sprinklers along the second row are spaced apart having no less than one channel therebetween without a sprinkler of the second row positioned therein, (iii) consecutive sprinklers along the second row are spaced apart having no more than five channels therebetween without a sprinkler of the second row positioned therein, and (iv) a plurality of the sprinklers along the second row each include a sprinkler frame having a respective first and second frame arms and a corresponding second fluid deflector secured to the sprinkler frame, the second fluid deflector being differently shaped than the first fluid deflector, and the second fluid deflector being asymmetrical about a plane defined through the first and second frame arms, a greater portion of the second fluid deflector being oriented downslope of the plane than upslope of the plane, the second fluid deflector thereby being configured to project fire suppression fluid both upslope and downslope and being configured to project more fire suppression fluid downslope than upslope; and wherein:

(i) each sprinkler of the second row is placed within a different channel from each of the sprinklers of the first row; and (ii) a farthest number of channels between a sprinkler of the first row and a sprinkler of the second row is three channels without any sprinkler of the first row or sprinkler of the second row.

2. The fire protection system of claim 1, wherein the first row of sprinklers is positioned within approximately twelve inches of the ridgeline.

3. The fire protection system of claim 1, wherein each channel is approximately three feet wide.

4. The fire protection system of claim 1, wherein each channel is approximately two feet wide.

5. The fire protection system of claim 1, wherein horizontal spacing between the first row of sprinklers and the second row of sprinklers is between approximately six feet and approximately thirty-five feet.

6. The fire protection system of claim 1, wherein the horizontal spacing between the first row of sprinklers and the second row of sprinklers is between approximately six feet and approximately sixteen feet.

7. The fire protection system of claim 1, wherein the first fluid deflector is configured to produce a generally elliptical spray distribution pattern.

8. The fire protection system of claim 1, wherein each sprinkler of the second row of sprinklers is mounted to the second branch line in a generally perpendicular orientation relative to the structural members.

9. The fire protection system of claim 1, wherein the second fluid deflector faces downslope.

10. The fire protection system of claim 1, wherein the first row of sprinklers are directly mounted to the first branch line and the second row of sprinklers are directly mounted to the second branch line.

11. A method of positioning fire protection sprinklers in a combustible concealed space having a pitched roof constructed of a plurality of generally spaced apart structural members extending downwardly and outwardly from a ridgeline of the roof to an eave of the roof, and the plurality of structural members defining respective channels therebetween, the method comprising the steps of:

mounting a first row of sprinklers to a first branch line proximate the ridgeline and extending generally parallel to the ridgeline, wherein:

(i) each sprinkler is positioned within a respective channel, (ii) consecutive sprinklers along the first row are spaced apart having no less than one channel therebetween without a sprinkler of the first row positioned therein, and (iii) consecutive sprinklers along the first row are spaced apart having no more than five channels therebetween without a sprinkler of the first row positioned therein, (iv) a plurality of the sprinklers along the first row include respective first fluid deflectors, the first fluid deflector being configured to produce a first spray distribution pattern, and;

mounting a second row of sprinklers to a second branch line extending generally parallel to the first branch line positioned downslope from the first branch line, wherein:

(i) each sprinkler of the second row is positioned within a respective channel, (ii) consecutive sprinklers along the second row are spaced apart having no less than one channel therebetween without a sprinkler of the second row positioned therein, (iii) consecutive sprinklers along the second row are spaced apart having no more than five channels therebetween without a sprinkler of the second row positioned therein, (iv) each sprinkler of the second row is placed within a different channel from each of the sprinklers of the first row;

(v) a farthest number of channels between a sprinkler of the first row and a sprinkler of the second row is three channels without any sprinkler of the first row or sprinkler of the second row; and (vi) a plurality of the sprinklers along the second row each include a sprinkler frame having a respective first and second frame arms and a corresponding second fluid deflector secured to the sprinkler frame, the second fluid deflector being differently shaped than the first fluid deflector, and the second fluid deflector being asymmetrical about a plane defined through the first and second frame arms, a greater portion of the second fluid deflector being oriented downslope of the plane than upslope of the plane, the second fluid deflector thereby being configured to project fire suppression fluid both upslope and downslope and being configured to project more fire suppression fluid downslope than upslope.

12. The method of claim 11, further comprising the step of positioning the first branch line within approximately twelve inches horizontally of the ridgeline.

13. The method of claim 11, further comprising the step of positioning the second branch line downslope from the first branch line at a location defining a horizontal spacing between the first row of sprinklers and the second row of sprinklers between approximately six feet and approximately thirty-five feet.

14. The method of claim 11, further comprising the step of positioning the second branch line downslope from the first branch line wherein the horizontal spacing between the first row of sprinklers and the second row of sprinklers is between approximately six feet and approximately sixteen feet.

15. The method of claim 11, wherein the step of mounting the second row of sprinklers to the second branch line comprises mounting the sprinklers projecting perpendicularly to the structural members.

16. The method of claim 11, wherein the first fluid deflector is configured to produce a generally elliptical spray distribution pattern.

17. The method of claim 11, wherein the step of mounting the second row of sprinklers to the second branch line comprises mounting the plurality of the sprinklers having the respective second fluid deflectors with the second fluid deflectors facing downslope.

18. The method of claim 11, wherein the step of mounting the first row of sprinklers to the first branch line comprises directly mounting the first row of sprinklers to the first branch line, and the step of mounting the second row of sprinklers to the second branch line comprises directly mounting the second row of sprinklers to the second branch line.

* * * * *